(No Model.)
M. J. BARTLETT.
ANIMAL TRAP.
No. 395,309. Patented Jan. 1, 1889.
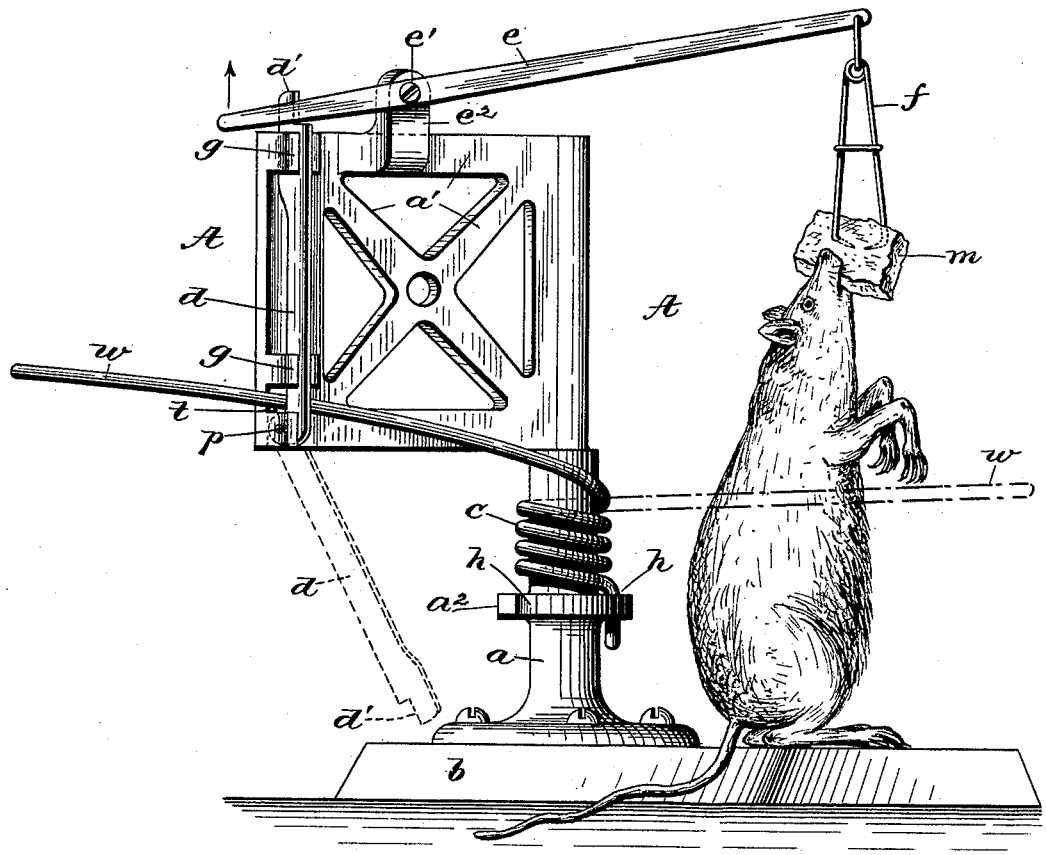
WITNESSES.
Charles Hannigan
Joseph Sanford
INVENTOR.
Marcus J. Bartlett.
by Remington & Henthorn
Attys.

ized.

UNITED STATES PATENT OFFICE.

MARCUS J. BARTLETT, OF PROVIDENCE, RHODE ISLAND.

ANIMAL-TRAP.

SPECIFICATION forming part of Letters Patent No. 395,309, dated January 1, 1889.

Application filed July 27, 1888. Serial No. 281,204. (No model.)

*To all whom it may concern:*

Be it known that I, MARCUS J. BARTLETT, a citizen of the United States, residing at Providence, in the county of Providence and State of Rhode Island, have invented certain new and useful Improvements in Animal-Traps; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

In the usual construction and arrangement of animal-traps the animals are so caught or entrapped that they die therein, thereby giving to the trap a peculiar odor or scent, which in a great measure serves to prevent other animals from visiting it, this being particularly true of the rat species, as they seldom visit a trap after three or four rats have died therein.

The object of my invention is to overcome the disadvantages or defects inherent in the traps just referred to.

Another advantage of my improvement is that it insures the killing of the animal, the construction of the trap being, moreover, comparatively inexpensive.

My improved trap consists, essentially, of a standard portion, around which a spring-wire is coiled. The free end of the wire is elongated horizontally, and is held in position under great tension by means of a pivoted lever, which in turn bears against a pivoted tripping-lever, on the long arm of which a bait is attached at a proper distance from the ground or base. The animal is forced to reach upwardly for the suspended bait, and after seizing it in its mouth the animal then naturally attempts to resume its former position, thereby depressing the end of the tripping-lever and releasing the wire or spring-arm, which latter instantly swings around with great force, and, striking the animal, hurls it from the trap dead. This method of killing animals is, I believe, very valuable, from the fact that the trap automatically throws them from it several feet, thereby preventing the trap from being tainted with an objectionable odor.

In the accompanying sheet of drawings I have shown a perspective view of my improved animal-trap. An animal is represented in the act of seizing the bait immediately preceding the depression of the tripping-lever.

The construction, arrangement, and operation may be described as follows:

A, referring to the drawing, designates the invention as a whole.

$a$ indicates the standard portion, from which at its upper end extends a frame, $a'$, having the tripping-lever, &c., mounted thereon. The standard terminates in an enlarged base, by which it is secured to a support or base, $b$. A flange or collar, $a^2$, is formed on the upright $a$, and is provided with a series of notches or openings, $h$, adapted to receive and retain an end of the spring-wire $w$.

$d$ indicates a check-lever, pivoted at $p$ to the outer end of the frame $a'$. Said frame is provided with guide wings or ears $g$ $g$, which serve to maintain the lever $d$ in position laterally.

To the upper portion of the frame $a'$ is formed an ear, $e^2$, to which at $e'$ is pivoted the tripping-lever $e$. The short arm of this lever bears against the upper or free end of the check-lever, which latter is notched, as at $d'$, or otherwise adapted to engage the lever $e$. The free end of the lever $e$ is elongated to extend over the center of the base $b$, and is provided with a suspended hook or holder, $f$, which is adapted to retain a suitable bait, $m$.

$w$ indicates a piece of comparatively thick spring-wire. An end thereof is inserted into a notch, $h$, and the wire then wound round the standard $a$ a few times to form a coil, $c$. The wire is then extended in a substantially horizontal direction, thereby forming a spring-arm. In order to "set" the trap, the bait $m$ being first suspended from the lever $e$, the free end portion of the wire $w$ is pressed back into a notch or recess, $t$, formed in the frame $a'$ intermediate of the pivot $p$ and the lower guide, $g$. The check-lever $d$ is then raised from the dotted-line position and swung back into the guides $g$, (the wire meanwhile being held in the recess $t$.) Finally, the rear end of the lever $e$ is depressed into engagement with the notch $d'$ of the check-lever. Now, by releasing the hold upon the wire its tension will cause the lever $d$ to press against the lever $e$ and maintain the trap in the set position, all as clearly shown by the drawing.

The trap is sprung or released by the animal after it seizes the bait $m$ in its endeavor to pull it from the hook, thereby depressing the corresponding end of the tripping-lever, thus releasing the free end of the lever $d$. The tension of the spring instantly vibrates the latter lever to the dotted-line position immediately followed by the arm of the wire, which swings around in a radial direction and strikes the animal with sufficient force to kill it, and at the same time hurl it from the trap.

The tension of the wire may be increased by withdrawing the end from a hole, $h$, and inserting it into another one located farther to the rear.

It is evident that many minor changes may be made in the design and arrangement of the parts constituting my improved animal-trap without departing from the spirit of the invention—as, for example, the spring-arm may be arranged so that it will vibrate in a vertical plane, although I consider the position of the wire as shown the best.

I claim as my invention—

1. In an animal-trap, the combination, with a standard having an extension provided with a bait-carrying tripping device, substantially as described, of a spring-arm, $w$, having an end thereof coiled around said standard and fixed therein, the opposite end thereof engaging with the tripping device, substantially as described, and for the purpose hereinbefore set forth.

2. The combination, in an animal-trap, with a standard and the spring-arm $w$, coiled around and attached to said standard, of a check-lever, $d$, pivoted to an extension of the standard adapted to retain the free end of said spring-arm in a normal position, and a pivoted tripping-lever, $e$, having one end adapted to engage the free end of the check-lever and the other provided with a bait-carrying hook, all constructed and arranged substantially as shown and hereinbefore described.

3. The animal-trap A, hereinbefore described, consisting of the standard $a$, provided with an extension, $a'$, the spring-arm $w$, coiled around the standard and secured thereto, the check-lever $d$, pivoted to said extension, and the pivoted bait-carrying tripping-lever $e$, adapted to engage the upper end of the check-lever, all combined and adapted for operation substantially as shown and described.

In testimony whereof I have affixed my signature in presence of two witnesses.

MARCUS J. BARTLETT.

Witnesses:
CHARLES HANNIGAN,
GEO. H. REMINGTON.